(12) United States Patent
Odorcic

(10) Patent No.: US 6,744,616 B2
(45) Date of Patent: Jun. 1, 2004

(54) METHOD AND APPARATUS FOR CONTROLLING AN ELECTRONIC CONTROL

(75) Inventor: Kresimir Odorcic, Shepherdsville, KY (US)

(73) Assignee: General Electric Company, Schenectady, NY (US)

(*) Notice: Subject to any disclaimer, the term of this patent is extended or adjusted under 35 U.S.C. 154(b) by 325 days.

(21) Appl. No.: 09/683,440

(22) Filed: Dec. 28, 2001

(65) Prior Publication Data

US 2003/0126519 A1 Jul. 3, 2003

(51) Int. Cl.[7] .............................................. H01H 47/00
(52) U.S. Cl. ...................... 361/160; 361/139; 361/195
(58) Field of Search ................................. 361/115, 160, 361/139, 195, 199

(56) References Cited

U.S. PATENT DOCUMENTS

| 5,086,385 A | * | 2/1992 | Launey et al. ................ 700/83 |
| 5,808,278 A | * | 9/1998 | Moon et al. ................. 219/506 |
| 6,473,661 B1 | * | 10/2002 | Wollner ....................... 700/83 |

* cited by examiner

Primary Examiner—Stephen W. Jackson
(74) Attorney, Agent, or Firm—H. Neil Houser, Esq.; Armstrong Teasdale LLP

(57) ABSTRACT

A method for controlling an electronic control using a circuit that includes a damper capacitor. The method includes substantially discharging the damper capacitor and enabling operation of the electronic control when the damper capacitor is substantially discharged.

27 Claims, 3 Drawing Sheets

METHOD AND APPARATUS FOR CONTROLLING AN ELECTRONIC CONTROL

BACKGROUND OF INVENTION

This invention relates generally to electronic controls and, more particularly, to watchdog circuits for electronic controls.

Known watchdog circuits use charge holding capacitors to protect appliances or other devices. Typically, a microprocessor generates a pulse train signal on a designated watchdog pin. The pulse train signal charges the capacitor, either directly or indirectly. As long as the microprocessor generates the pulse train signal, the voltage across the capacitor remains between an upper and a lower threshold, and the watchdog circuit enables normal operation of the electronic control that is controlling the appliance or other device. If the microprocessor stops generating the pulse train signal, the voltage across the capacitor falls outside the thresholds, and the watchdog circuit disables normal operation of the electronic control. Known watchdog circuits use many components to keep the capacitor charged, thereby increasing the cost and decreasing the reliability of the circuit.

SUMMARY OF INVENTION

In one aspect, a method is provided for controlling an electronic control using a circuit that includes a damper capacitor. The method includes substantially discharging the damper capacitor and enabling operation of the electronic control when the damper capacitor is substantially discharged.

In another aspect, a method is provided for controlling an electronic control using a circuit that includes a damper capacitor. The method includes charging the damper capacitor and disabling operation of the electronic control when the damper capacitor is charged.

In another aspect, an appliance is provided that includes a watchdog circuit. The watchdog circuit includes a damper capacitor and an electronic appliance control that is electrically coupled to the watchdog circuit. The appliance control is operable when the damper capacitor is substantially discharged, and inoperable when the damper capacitor is charged.

In yet another aspect, a circuit is provided for controlling an electronic control. The circuit includes a damper capacitor and is configured to enable operation of the electronic control when the damper capacitor is substantially discharged, and disable operation of the electronic control when the damper capacitor is charged.

In a further aspect, a circuit is provided for controlling an electronic control. The circuit includes a damper capacitor and a damper reset transistor that is electrically coupled to the damper capacitor. The damper reset transistor has a first reset mode and a second reset mode, and is configured to substantially discharge when the damper reset transistor is in the first reset mode. The damper capacitor is configured to charge when the damper reset transistor is in the second reset mode. The circuit further includes an enable transistor that is electrically coupled to the damper capacitor and the electronic control. The enable transistor has a first enable mode and a second enable mode, and is configured to remain in the first enable mode when the damper capacitor is substantially discharged. The enable transistor is configured to remain in the second enable mode when the damper capacitor is charged. The circuit is configured to enable operation of the electronic control when the enable transistor is in the first enable mode, and disable operation of the electronic control when the enable transistor is in the second enable mode.

DETAILED DESCRIPTION

Figure 1:
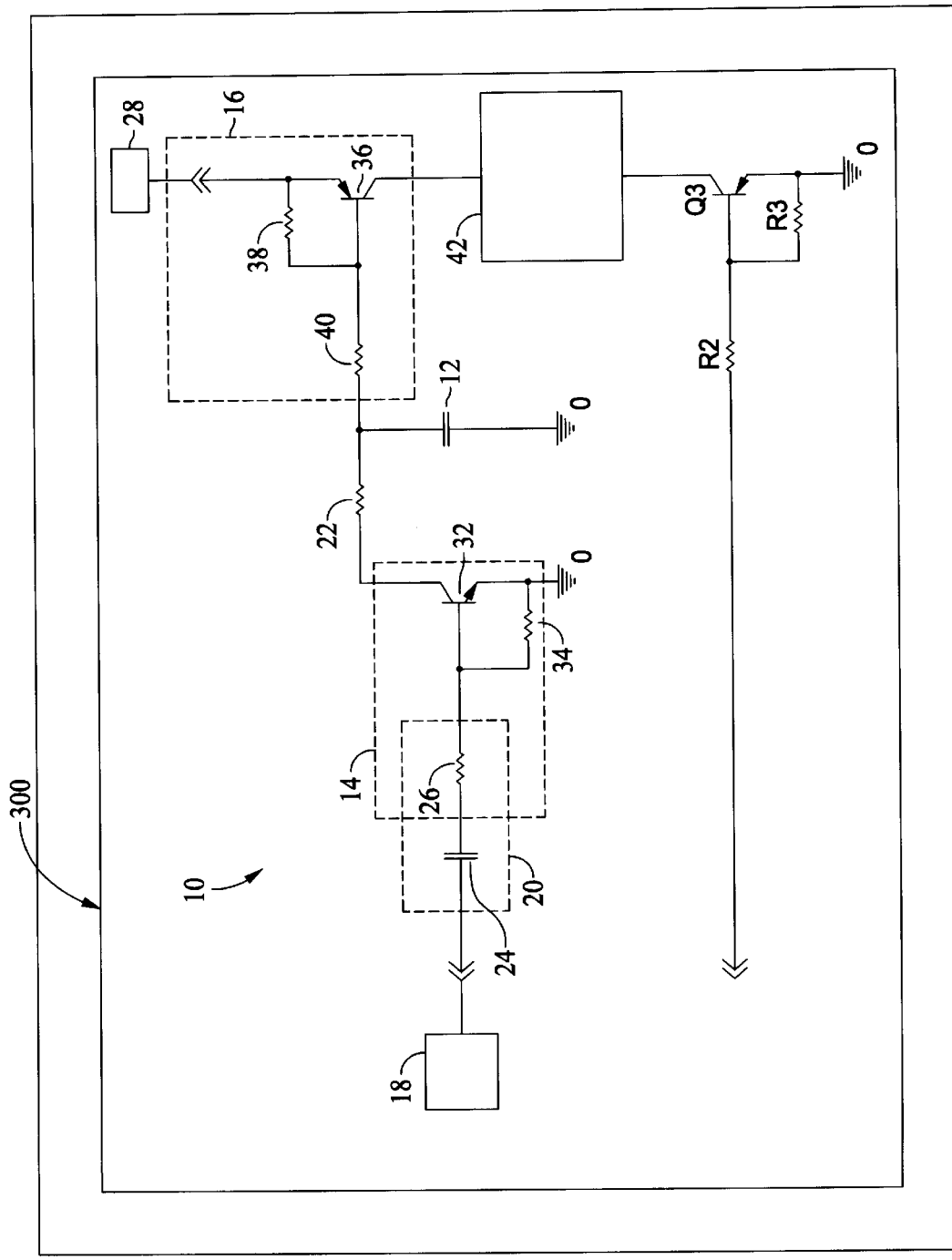
FIG. 1 is a circuit diagram illustrating one embodiment of a watchdog circuit.

FIG. 1 is a circuit diagram illustrating one embodiment of a watchdog circuit 10 for protecting an appliance 200. In one embodiment, watchdog circuit 10 protects an electric range oven (not shown), however, it will be understood that watchdog circuit may protect any appliance 200 that includes an electronic appliance control 300. Further, although watchdog circuit 10 is illustrated herein to protect an appliance, it will be understood that watchdog circuit 10 may protect any device that includes an electronic control, and is not limited to appliances or appliance controls. In addition, although watchdog circuit 10 is illustrated herein as embedded within an appliance control, it will be understood that watchdog circuit 10 may be embedded within any electronic control, or may be a separate component from the electronic control within the appliance or device. Watchdog circuit 10 includes a damper capacitor 12, a damper reset circuit 14, and an enable circuit 16, which is electrically coupled to damper capacitor 12. Damper reset circuit 14 is electrically coupled to a microprocessor 18 through a differentiator 20 and a designated watchdog pin (not shown) on microprocessor 18, and electrically coupled to damper capacitor 12 through a resistor 22. Differentiator 20 includes a differentiator capacitor 24 that is electrically coupled in series to a resistor 26. Enable circuit 16 is electrically coupled to a power source 28.

Damper reset circuit 14 includes a damper reset transistor 32 and a biasing resistor 34 that is electrically coupled in parallel with input (not shown) of damper reset transistor 32. Damper reset transistor 32 and biasing resistor 34 are electrically coupled to differentiator 20. Damper reset transistor 32 has a first reset mode and a second reset mode. The first reset mode allows electrical current to flow through damper reset transistor 32 while the second reset mode prevents electrical current from flowing through transistor 32. Enable circuit 16 includes an enable transistor 36, a biasing resistor 38, and a resistor 40. Biasing resistor 38 is electrically coupled in parallel with input (not shown) of enable transistor 36. Biasing resistor 38 and enable transistor 36 are electrically coupled to damper capacitor 12 through resistor 40. Enable transistor 36 includes a first enable mode and a second enable mode. The first enable mode allows electrical current to flow through enable transistor 36 while the second enable mode prevents electrical current from flowing through transistor 36.

Although damper reset transistor 32 and enable transistor 36 are illustrated and described herein as transistors, it will be understood that damper reset transistor 32 and enable transistor 36 are not limited to transistors. Rather, damper reset transistor 32 and enable transistor 36 may be any electronic switch that includes a first position that allows electrical current to flow through the switch and a second position that prevents electrical current from flowing through the switch.

In operation, microprocessor 18 monitors and controls the operation of appliance control 300, and appliance control 300 monitors and controls the operation of appliance 200. When appliance control 300 is operating normally, microprocessor 18 generates a pulse train signal on a designated watchdog pin (not shown) and sends the pulse train signal to damper reset transistor 32. The pulse train signal is AC coupled to damper reset transistor through differentiator 20. When biasing resistor 34 and damper reset transistor 32 receive the pulse train signal, damper reset transistor 32 is biased in the first reset mode. When biasing resistor 34 and damper reset transistor 32 do not receive the pulse train signal, damper reset transistor 32 is biased in the second reset mode. Upon rising edge occurrence from the signal, damper reset transistor 32 momentarily switches to the first reset mode from the second reset mode, thereby allowing electrical current to flow through damper reset transistor 32 from voltage source 28. The flow of electrical current through damper reset transistor 32 from voltage source 28 causes damper capacitor 12 to substantially discharge any voltage that has built up across damper capacitor 12. Thus, when damper reset transistor 32 is continuously receiving the pulse train signal from microprocessor 18, damper reset transistor 32 is repeatedly switching from the second reset mode to the first reset mode and damper capacitor 12 is repeatedly discharging, thereby remaining substantially discharged. When damper capacitor 12 is substantially discharged, damper capacitor 12 and biasing resistor 38 bias enable transistor 36 in the first enable mode, thereby allowing electrical current to flow through enable transistor 36. When damper capacitor 12 is charged, damper capacitor 12 and biasing resistor 38 bias enable transistor 36 in the second enable mode. The flow of electrical current through enable transistor 36 enables operation of appliance control 300. Thus, when damper reset transistor 32 continuously receives the pulse train signal from microprocessor 18, appliance control 300 is operable. When appliance control 300 is operable, appliance 200 is thereby also operable. For example, when appliance control 300 is operable, at least one device 42 that appliance control 300 controls is operable. Devices 42 may include, but are not limited to, relays, solenoids, motors, and lamps.

When appliance control 300 is operating abnormally, microprocessor 18 stops generating and sending, or interrupts, the pulse train signal to damper reset transistor 32. As a result, damper reset transistor 32 remains in the second reset mode and damper capacitor 12 charges with voltage from power source 28 and through biasing resistor 38 and resistor 40. Once damper capacitor 12 is fully charged, damper capacitor 12 no longer biases enable transistor 36 in the first enable mode and enable transistor 36 switches to the second enable mode. The second enable mode inhibits electrical current from flowing through enable transistor 36, thereby disabling operation of appliance control 300. When appliance control 300 is disabled, appliance 200 is thereby also disabled. For example, when appliance control 300 is disabled, devices 42 are also disabled.

In one embodiment, to ensure normal operation of watchdog circuit 10, the discharge time constant, determined by multiplying the resistance of resistor 22 by the capacitance of damper capacitor 12, is approximately five to ten times smaller than the charge time constant, determined by multiplying the resistance of resistor 40 by the capacitance of damper capacitor 12.

Figure 2:
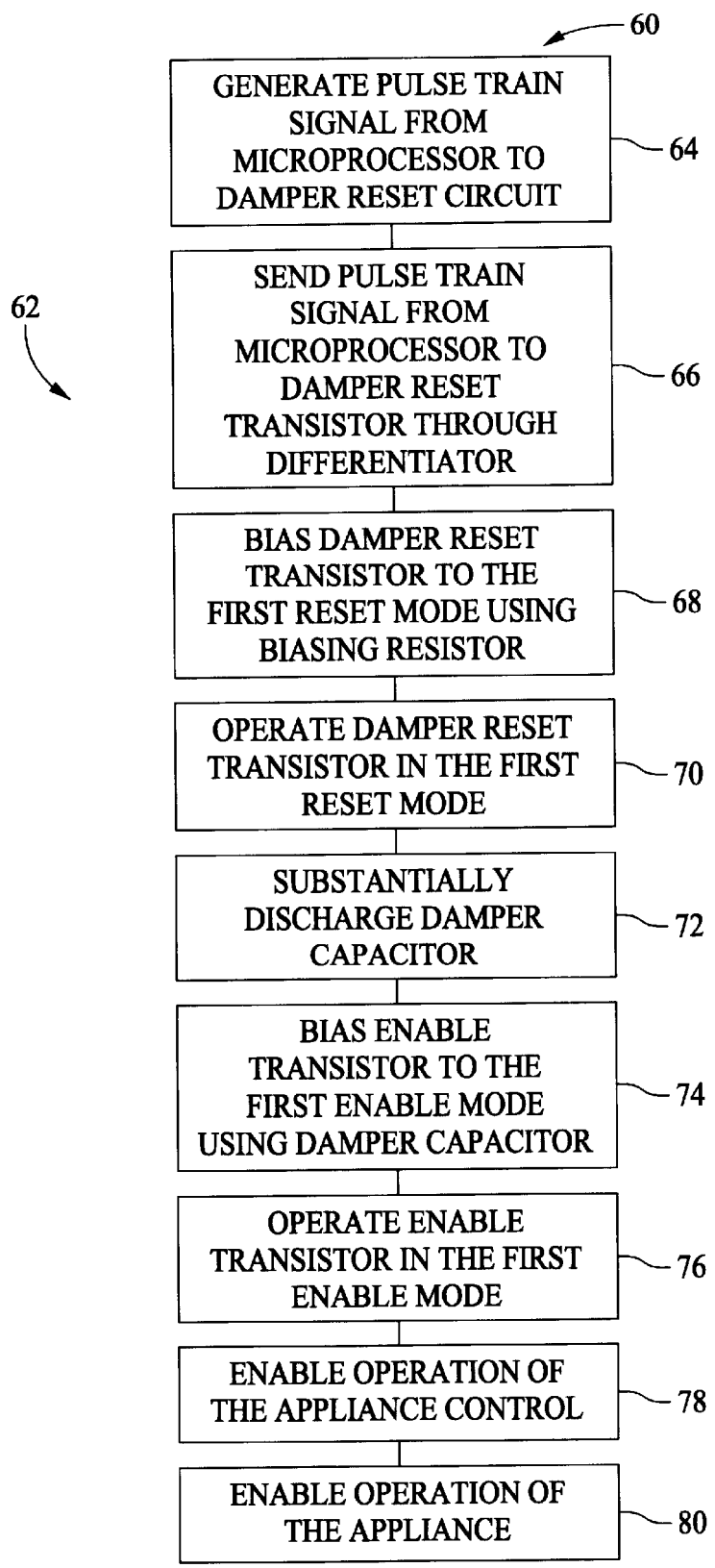
FIG. 2 is a flowchart illustrating one embodiment of a method for controlling an appliance control using the watchdog circuit of the present invention.

FIG. 2 is a flowchart 60 illustrating one embodiment of a method 62 for controlling appliance control 300 using watchdog circuit 10 (shown in FIG. 1).

Method 62 includes generating 64 a pulse train signal from microprocessor 18 (shown in FIG. 1) to damper reset circuit 14 (shown in FIG. 1), sending 66 the pulse train signal from microprocessor 18 to damper reset transistor 32 (shown in FIG. 1) through differentiator 20 (shown in FIG. 1), and biasing 68 damper reset transistor 32 to the first reset mode. Method 62 further includes operating 70 damper reset transistor 32 in the first reset mode, substantially discharging 72 damper capacitor 12 (shown in FIG. 1), and biasing 74 enable transistor 36 (shown in FIG. 1) to the first enable mode using damper capacitor 12. Still further, method 62 includes operating 76 enable transistor 36 in the first enable mode, enabling 78 operation of appliance control 300, and enabling 80 operation of the appliance 200.

Figure 3:
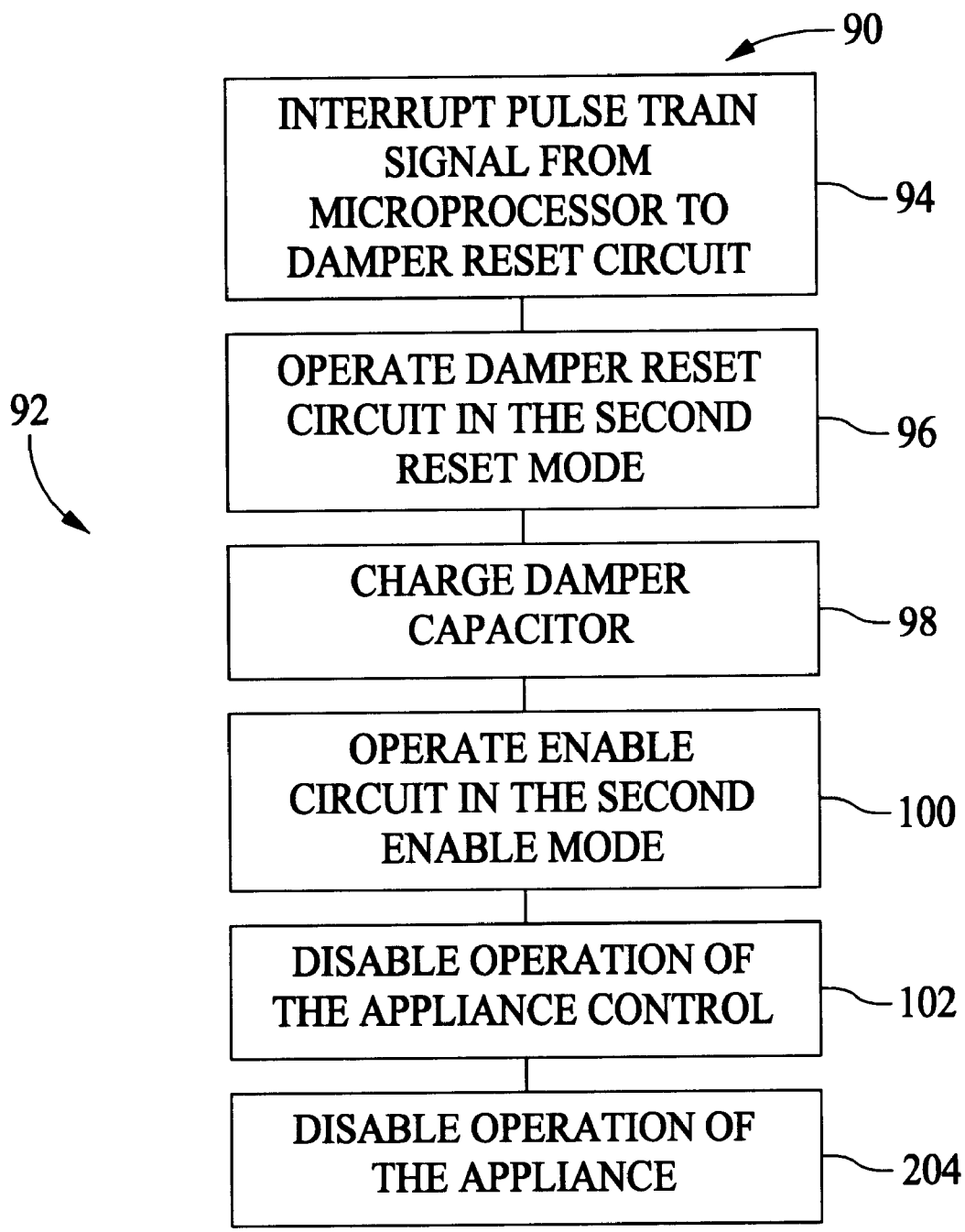
FIG. 3 is a flowchart illustrating one embodiment of a method for controlling an appliance control using the watchdog circuit of the present invention.

FIG. 3 is a flowchart 90 illustrating another embodiment of a method 92 for controlling appliance control 300 using watchdog circuit 10 (shown in FIG. 1). Method 92 includes interrupting 94 a pulse train signal from microprocessor 18 (shown in FIG. 1) to damper reset circuit 14 (shown in FIG. 1), operating 96 damper reset circuit 14 in the second reset mode, and charging 98 damper capacitor 12 (shown in FIG. 1). Method 92 further includes operating 100 enable circuit 16 in the second enable mode, disabling 102 operation of appliance control 300, and disabling 104 operation of appliance 200.

The term microprocessor, as used herein, also refers to microcontrollers, reduced instruction set circuits (RISC), application specific integrated circuits (ASICs), logic circuits, computers, PLCs, and any other circuit or processor capable of executing the functions described above.

While the invention has been described in terms of various specific embodiments, those skilled in the art will recognize that the invention can be practiced with modification within the spirit and scope of the claims.

What is claimed is:

1. A method for controlling an electronic control using a circuit including a damper capacitor, said method comprising:

substantially discharging the damper capacitor; and enabling operation of the electronic control when the damper capacitor is substantially discharged.

2. A method in accordance with claim 1 wherein the circuit includes a damper reset circuit electrically coupled to the damper capacitor, the damper reset circuit comprises a first reset mode and a second reset mode, and said substantially discharging the damper capacitor comprises operating the damper reset circuit in the first reset mode.

3. A method in accordance with claim 1 wherein the circuit includes an enable circuit electrically coupled to the damper capacitor and the electronic control, the enable circuit comprises a first enable mode and a second enable mode, and said enabling operation of the appliance control comprises operating the enable circuit in the first enable mode.

4. A method in accordance with claim 2 wherein the circuit includes a microprocessor electrically coupled to the damper reset circuit, and said operating the damper reset circuit in the first reset mode comprises generating a pulse train signal from the microprocessor to the damper reset circuit.

5. A method in accordance with claim 4 wherein the damper reset circuit includes a differentiator and an electronic reset switch, the differentiator electrically coupled to the microprocessor and the reset switch, and said generating a pulse train signal from the microprocessor to the damper reset circuit comprises sending the pulse train signal from the microprocessor to the reset switch through the differentiator.

6. A method in accordance with claim 5 wherein the damper reset switch is a transistor.

7. A method in accordance with claim 5 wherein the damper reset circuit includes a biasing resistor electrically coupled to the reset transistor, the reset transistor comprises a first reset mode and a second reset mode, said substantially discharging the damper capacitor comprises operating the reset transistor in the first reset mode, and said method further comprises biasing the reset transistor to the first reset mode.

8. A method in accordance with claim 3 wherein the enable circuit includes an electronic enable switch, the enable switch comprises a first enable mode and a second enable mode, said enabling operation of the electronic control comprises operating the enable switch in the first enable mode, and said substantially discharging the damper capacitor comprises biasing the enable transistor to the first enable mode using the damper capacitor.

9. A method in accordance with claim 8 wherein the electronic enable switch is a transistor.

10. A method for controlling an electronic control using a circuit including a damper capacitor, said method comprising:
charging the damper capacitor; and
disabling operation of the electronic control when the damper capacitor is charged.

11. A method in accordance with claim 10 wherein the circuit includes a enable circuit electrically coupled to the damper capacitor and the electronic control, the enable circuit comprises a first enable mode and a second enable mode, and said disabling operation of the electronic control comprises operating the enable circuit in the second enable mode.

12. A method in accordance with claim 10 wherein the circuit includes a damper reset circuit electrically coupled to the damper capacitor, the damper reset circuit comprises a first reset mode and a second reset mode, and said charging the damper capacitor comprises operating the damper reset circuit in the second reset mode.

13. A method in accordance with claim 12 wherein the circuit includes a microprocessor electrically coupled to the damper reset circuit, and said operating the damper reset circuit in the second reset mode comprises interrupting a pulse train signal from the microprocessor to the damper reset circuit.

14. An appliance comprising:
a watchdog circuit comprising a damper capacitor; and
an appliance control electrically coupled to said watchdog circuit, said appliance control operable when said damper capacitor substantially discharged, and inoperable when said damper capacitor charged.

15. An appliance in accordance with claim 14, said watchdog circuit further comprising an electronic enable switch electrically coupled to said damper capacitor and said appliance control, said enable switch having a first enable mode and a second enable mode and biased to said first enable mode when said damper capacitor substantially discharged, said appliance control operable when said enable switch in said first enable mode, and inoperable when said enable switch in said second enable mode.

16. An appliance in accordance with claim 14, said watchdog circuit further comprising an electronic damper reset switch electrically coupled to said damper capacitor, and a biasing resistor, said damper reset switch having a first reset mode and a second reset mode, said damper capacitor configured to remain substantially discharged when said damper reset switch in said first reset mode, and configured to charge when said damper reset switch in said second reset mode.

17. An appliance in accordance with claim 16, said watchdog circuit further comprising a differentiator electrically coupled to said damper reset switch, said appliance further comprising a microprocessor electrically coupled to'said differentiator, said microprocessor configured to send a pulse train signal to said damper reset switch through said differentiator, said biasing resistor configured to bias said damper reset switch to said first reset mode when said damper reset switch receives said pulse train signal.

18. An appliance in accordance with claim 17, said differentiator comprising a differentiator capacitor electrically coupled to a differentiator resistor.

19. A circuit for controlling an electronic control, said circuit comprising:
a damper capacitor, said circuit configured to enable operation of the electronic control when said damper capacitor substantially discharged, and disable operation of the electronic control when said damper capacitor charged.

20. A circuit in accordance with claim 19 further comprising an enable circuit electrically coupled to said damper capacitor, said enable circuit having a first enable mode and a second enable mode, said enable circuit configured to remain in said first enable mode when said damper capacitor substantially discharged, and configured to remain in said second enable mode when said damper capacitor charged.

21. A circuit in accordance with claim 20 wherein said enable circuit comprises an electronic enable switch.

22. A circuit in accordance with claim 19 further comprising a damper reset circuit electrically coupled to said damper capacitor, said damper reset circuit having a first reset mode and a second reset mode, said damper capacitor configured to substantially discharge when said damper reset circuit in said first reset mode, said damper capacitor configured to charge when said damper reset circuit in said second reset mode.

23. A circuit in accordance with claim 22, said damper reset circuit comprising an electronic damper reset switch and a biasing resistor, said biasing resistor configured to bias said damper reset circuit to said first reset mode.

24. A circuit in accordance with claim 21 wherein said electronic enable switch a transistor.

25. A circuit in accordance with claim 23 wherein said electronic damper reset switch a transistor.

26. A circuit for controlling an electronic control, said circuit comprising:
a damper capacitor;
a damper reset transistor electrically coupled to said damper capacitor, said damper reset transistor having a first reset mode and a second reset mode, said damper capacitor configured to substantially discharge when said damper reset transistor in said first reset mode, said damper capacitor configured to charge when said damper reset transistor in said second reset mode; and
an enable transistor electrically coupled to said damper capacitor and the electronic control, said enable transistor having a first enable mode and a second enable mode, said enable transistor configured to remain in said first enable mode when said damper capacitor substantially discharged, said enable transistor configured to remain in said second enable mode when said damper capacitor charged, said circuit configured to enable operation of the electronic control when said enable transistor in said first enable mode, said circuit configured to disable operation of the electronic control when said enable transistor in said second enable mode.

27. A circuit in accordance with claim 26 further comprising a biasing resistor configured to bias said damper reset transistor to said first reset mode.

* * * * *

UNITED STATES PATENT AND TRADEMARK OFFICE
CERTIFICATE OF CORRECTION

PATENT NO. : 6,744,616 B2
DATED : June 1, 2004
INVENTOR(S) : Kresimir Odorcic

It is certified that error appears in the above-identified patent and that said Letters Patent is hereby corrected as shown below:

Column 6,
Line 15, delete "to'" and insert -- to --.

Signed and Sealed this

Tenth Day of January, 2006

JON W. DUDAS
*Director of the United States Patent and Trademark Office*